(12) United States Patent
Martin et al.

(10) Patent No.: US 11,748,241 B2
(45) Date of Patent: Sep. 5, 2023

(54) METHOD AND APPARATUS FOR GENERATING SIMULATED TEST IO OPERATIONS

(71) Applicant: EMC IP HOLDING COMPANY LLC, Hopkinton, MA (US)

(72) Inventors: Owen Martin, Hopedale, MA (US); Rasa Raghavan, Verona, WI (US)

(73) Assignee: Dell Products, L.P., Hopkinton, MA (US)

( * ) Notice: Subject to any disclaimer, the term of this patent is extended or adjusted under 35 U.S.C. 154(b) by 151 days.

(21) Appl. No.: 17/151,776

(22) Filed: Jan. 19, 2021

(65) Prior Publication Data

US 2022/0229768 A1    Jul. 21, 2022

(51) Int. Cl.
| | |
|---|---|
| *G06F 11/36* | (2006.01) |
| *G06F 11/14* | (2006.01) |
| *G06F 11/34* | (2006.01) |
| *G06F 18/214* | (2023.01) |
| *G06N 3/045* | (2023.01) |

(52) U.S. Cl.
CPC ...... *G06F 11/3688* (2013.01); *G06F 11/1407* (2013.01); *G06F 11/3414* (2013.01); *G06F 11/3692* (2013.01); *G06F 18/214* (2023.01); *G06N 3/045* (2023.01)

(58) Field of Classification Search
CPC ............. G06F 11/3688; G06F 11/1407; G06F 11/3414; G06F 11/3692; G06K 9/6256; G06N 3/0454

USPC ........................................................ 717/124
See application file for complete search history.

(56) References Cited

U.S. PATENT DOCUMENTS

| | | | | |
|---|---|---|---|---|
| 2016/0134493 | A1* | 5/2016 | Susarla | G06F 3/06 709/224 |
| 2016/0378881 | A1* | 12/2016 | Agarwal | G06F 16/955 707/703 |
| 2020/0249928 | A1* | 8/2020 | Zeng | G06F 8/656 |
| 2020/0314171 | A1* | 10/2020 | Featonby | G06F 9/45558 |
| 2022/0067181 | A1* | 3/2022 | Carley | G06N 20/00 |
| 2022/0193412 | A1* | 6/2022 | Bruns | A61N 1/36038 |

* cited by examiner

*Primary Examiner* — Chat C Do
*Assistant Examiner* — Bradford F Wheaton
(74) *Attorney, Agent, or Firm* — Anderson Gorecki LLP (57) ABSTRACT

Different storage platforms and different applications generate different types of traffic. Separate learning processes are trained using live IO operations from different types of reference workloads. The reference workloads are based on multiple types of applications executing in multiple types of environments. Example applications may include Oracle, SAP, SQL, etc. Example environments may include finance/banking, retail, on-line transaction processing, healthcare, etc. Once the learning processes have been trained, trained model checkpoints describing the trained learning processes are stored in a reference workload repository. The trained model checkpoints are used in a testing environment to enable a test server to create a test model configured to generate simulated test IO operations to be applied to a storage system. The generated test IO operations simulate the workload from an intended application and environment where the storage system will be used.

15 Claims, 9 Drawing Sheets

| id | fileid | timestamp | op | cpu | tdev | lba | size |
|---|---|---|---|---|---|---|---|
| 1653850176 | 27 | 1523194727 | read | 29 | 942 | 7087394 | 1 |
| 1653850177 | 27 | 1523194976 | write | 77 | 377 | 314081903 | 40 |
| 1653850178 | 27 | 1523194752 | write | 29 | 377 | 314063679 | 32 |
| 1653850179 | 27 | 1523194759 | write | 45 | 377 | 314091191 | 32 |
| 1653850180 | 27 | 1523195004 | write | 77 | 377 | 314091223 | 16 |
| 1653850181 | 27 | 1523194774 | write | 29 | 377 | 314081991 | 8 |
| 1653850182 | 27 | 1523194788 | write | 45 | 377 | 314091239 | 32 |
| 1653850183 | 27 | 1523194813 | write | 29 | 377 | 314091271 | 24 |
| 1653850184 | 27 | 1523194807 | write | 45 | 624 | 90531616 | 8 |
| 1653850185 | 27 | 1523194813 | write | 45 | 377 | 314082063 | 16 |

FIG. 7

| id | fileid | timestamp | op | cpu | tdev | lba | size |
|---|---|---|---|---|---|---|---|
| 1653815496 | 27 | 1522752473 | write | 29 | 377 | 312365133 | 16 |
| 1653805495 | 27 | 1522247626 | read | 29 | 580 | 1522266124 | 32 |
| 1653773495 | 27 | 1521296065 | write | 61 | 554 | 25552099 | 8 |
| 1653825493 | 27 | 1522853520 | write | 29 | 377 | 312026487 | 32 |
| 1653823490 | 27 | 1521031630 | write | 61 | 377 | 313806641 | 64 |
| 1653835491 | 27 | 1522029152 | read | 77 | 571 | 3115508284 | 8 |
| 1653823491 | 27 | 1522351596 | write | 29 | 932 | 22327093 | 256 |
| 1653809497 | 27 | 1523130901 | write | 61 | 315 | 635295262 | 24 |
| 1653831498 | 27 | 1521648555 | write | 29 | 377 | 311398877 | 32 |
| 1653835495 | 27 | 1522751995 | write | 61 | 632 | 15548060 | 32 |
| 1653753493 | 27 | 1521431507 | write | 61 | 377 | 311799913 | 8 |
| 1653811471 | 27 | 1523178214 | read | 29 | 571 | 3979556224 | 8 |
| 1653789489 | 27 | 1521031549 | write | 21 | 377 | 312087179 | 32 |
| 1653799493 | 27 | 1522803212 | read | 61 | 571 | 3120525748 | 8 |
| 1653821498 | 27 | 1523078352 | write | 61 | 315 | 818196628 | 8 |
| 1653817493 | 27 | 1521640619 | write | 29 | 377 | 313999919 | 56 |
| 1653823496 | 27 | 1522613112 | read | 29 | 931 | 3980422667 | 256 |
| 1653789494 | 27 | 1521511764 | read | 77 | 571 | 3120658592 | 32 |
| 1653831491 | 27 | 1522521565 | write | 45 | 702 | 55271963886 | 16 |
| 1653793499 | 27 | 1521752157 | write | 61 | 512 | 2529238881 | 56 |
| 1653761497 | 27 | 1521471204 | write | 45 | 312 | 708249239 | 8 |
| 1653767499 | 27 | 1521337556 | read | 45 | 785 | 159243772 | 16 |
| 1653847494 | 27 | 1522077042 | write | 61 | 930 | 253133796 | 8 |
| 1653827499 | 27 | 1522188216 | write | 61 | 164 | 3310392 | 8 |
| 1653845478 | 27 | 1522752934 | read | 77 | 569 | 3755242483 | 8 |
| 1653753482 | 27 | 1521207399 | write | 45 | 32 | | |

FIG. 8B
Simulated Traffic

FIG. 8A
Actual Traffic

METHOD AND APPARATUS FOR GENERATING SIMULATED TEST IO OPERATIONS

FIELD

This disclosure relates to computing systems and related devices and methods, and, more particularly, to a method and apparatus for generating simulated test Input/Output (IO) operations.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

Host applications issue IO (Input/Output) operations on storage systems to access and store data stored on the storage systems. Different host applications will have different IO workload characteristics and, similarly, a given host application may operate differently in different environments. Example applications may include Oracle, SAP, SQL, etc. Example environments may include finance/banking, retail, on-line transaction processing, healthcare, etc. To ensure that a given storage system will meet its service level objectives, it is useful to test the response of the storage system to an expected IO workload.

According to some embodiments, multiple learning processes are trained using live IO operations from different types of reference workloads. Each learning process is trained on a particular reference workload that is generated by a particular application executing in a particular environment. By training each learning process based on live IO operations from an executing application, the learning process is able to learn the IO characteristics of the reference workload issued by the executing application. The IO characteristics, in some embodiments, includes the number of devices used by the application, the range of addresses used by the application, the range of size of IO operations, the sequentiality of the IO operations, and other parameters characterizing the workload characteristics.

Once the learning processes have been trained, parameters describing the trained learning processes, referred to herein as trained model checkpoints, are stored in a reference workload repository along with metadata describing the application and environment where the trained learning process was created. If a storage system is to be tested, the trained model checkpoints of one of the learning processes that was created based on a similar application and environment is selected and loaded to a test server. The test server uses the trained model checkpoints to instantiate a test model configured to generate simulated test IO operations having the same IO characteristics as the reference workload. The test server issues the simulated test IO operations on the storage system under test, to simulate the application workload on the storage system.

DETAILED DESCRIPTION

Figure 1:
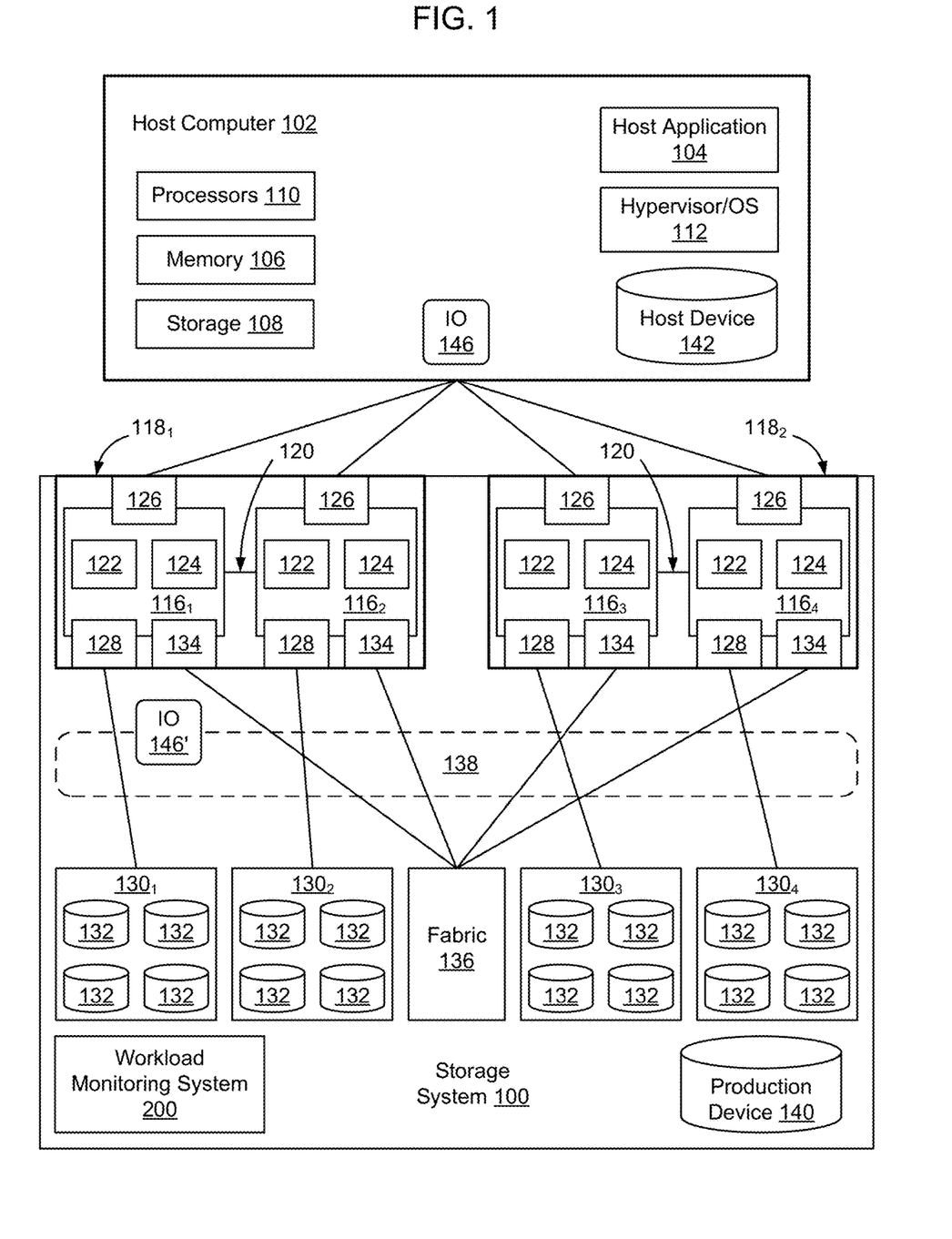
FIG. 1 is a functional block diagram of an example storage system connected to a host computer, according to some embodiments.

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (operating system) 112. The processors 110 may include one or more multi-core processors that include multiple CPUs, GPUs, and combinations thereof. The host volatile memory 106 may include RAM (Random Access Memory) of any type. The persistent storage 108 may include tangible persistent storage components of one or more technology types, for example and without limitation Solid State Drives (SSDs) and Hard Disk Drives (HDDs) of any type, including but not limited to SCM (Storage Class Memory), EFDs (enterprise flash drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented in a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back end adapters 128 for communicating with respective associated back end drive arrays $130_1$-$130_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using Non-Volatile Memory (NVM) media technologies, such as NAND-based flash, or higher-performing Storage Class Memory (SCM) media technologies such as 3D XPoint and Resistive RAM (ReRAM). Managed drives 132 may be directly connected to the compute nodes $116_1$-$116_4$, using a PCIe bus or may be connected to the compute nodes $116_1$-$116_4$, for example, by an InfiniBand (IB) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via Direct Memory Access (DMA) or Remote Direct Memory Access (RDMA).

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (logical block addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application 104 data in the virtual shared global memory 138 and the managed drives 132. In response to an IO (input/output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 via one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

When changes are proposed to be implemented on a particular storage system 100, or a new storage system is to be deployed, it is often desirable to test the storage system to make sure that the storage system will be able to meet desired service level performance metrics. For example, it may be desirable to ensure that the storage system can handle a certain number of IO operations per second while maintaining a response time below a given threshold. To test a storage system, test input/output read/write operations are sent to the storage system, and the behavior of the storage system is monitored to determine whether the storage system is able to meet its service level performance metrics. Input/output operations that are used to test a storage system are referred to herein as "test IO operations".

Unfortunately, generating test IO operations is not straightforward. Different applications can exhibit different IO characteristics, and accordingly the test IO operations will vary based on the type of application that will be using the storage system for storage of data. Likewise, a given application may exhibit different workload characteristics based on the environment in which it is used. For example, a database application may exhibit different workload characteristics if it is used in connection with on-line transaction processing than it would if used in a healthcare setting.

One way to generate test IO operations is to monitor IO operations of an executing application of the same type in the same environment, and store 10 trace information from the executing application in a memory of a test server. This test IO workload can then be played back by the test server on a storage system under test to determine how the storage system under test responds to the test workload. While this method has the advantage of being based on previous actual application IO traffic, the volume of test IO operations that can be stored is limited by the amount of memory of the test server. Further, due to the size of the 10 test data, it is difficult to use this technique to implement longer time-series tests.

Another way to generate test IO operations is to actually execute the application on the test server, and apply the IOs generated by the application to the storage system under test. Unfortunately, depending on the type of application and expected number of IO operations per second, this can require a very powerful and expensive test server.

According to some embodiments, multiple learning processes are trained using live IO operations from applications in different environments. Each learning process is trained on a particular reference workload that is generated by a particular application that is being used in a particular environment. By training a learning process based on live IO operations from an application operating in a particular environment, the learning process is able to learn the IO characteristics of the reference workload associated with that particular application/environment combination. The IO characteristics, in some embodiments, includes the number of devices used by the application, the range of addresses used by the application, the range of size of IO operations, the sequentiality of the IO operations, and other parameters characterizing the workload of the application in that environment.

Once a learning process has been trained, parameters referred to herein as trained model checkpoints, that describe the learning process, are stored in a reference workload repository along with metadata describing the application and environment where the trained learning process was created.

If a storage system is to be tested, the trained model checkpoints of one of the learning processes that was created based on a similar application and environment is selected and loaded to a test server. The test server uses the trained model checkpoints to instantiate a test model configured to generate simulated test IO operations having the same IO characteristics as the reference workload.

A centralized monitoring system is used to determine overall volume of IO operations—IOPS (IOs Per Second)—of the application executing on other storage systems. This volume information, from the centralized monitoring system, is used to specify the number of IOPS that the test server should generate. The test server issues the simulated test IO operations on the storage system under test, to simulate the application workload on the storage system.

In some embodiments, to generate simulated test IO operations associated with a particular application in a particular environment, a test server obtains the trained model checkpoints of the respective trained model from the reference workload repository. The required devices (storage volumes) are then created on the storage system under test and populated with data. The test server uses the trained model checkpoints to create a test model, and uses the IOPS information from the central monitoring system to generate simulated test IO operations that are applied to the storage system under test. Since the simulated test IO operations are synthetically generated by the test server, the quantity of simulated test IO operations that can be applied to the storage system under test is not limited by test server memory. Since the test server is not required to actually execute the application, but rather simply generates simulated test IO operations intended to mimic the workload of an executing application, an inexpensive server may be used to simply generate simulated test IO operations that have the same workload characteristics as the application would be expected to produce during actual operation.

Figure 2:
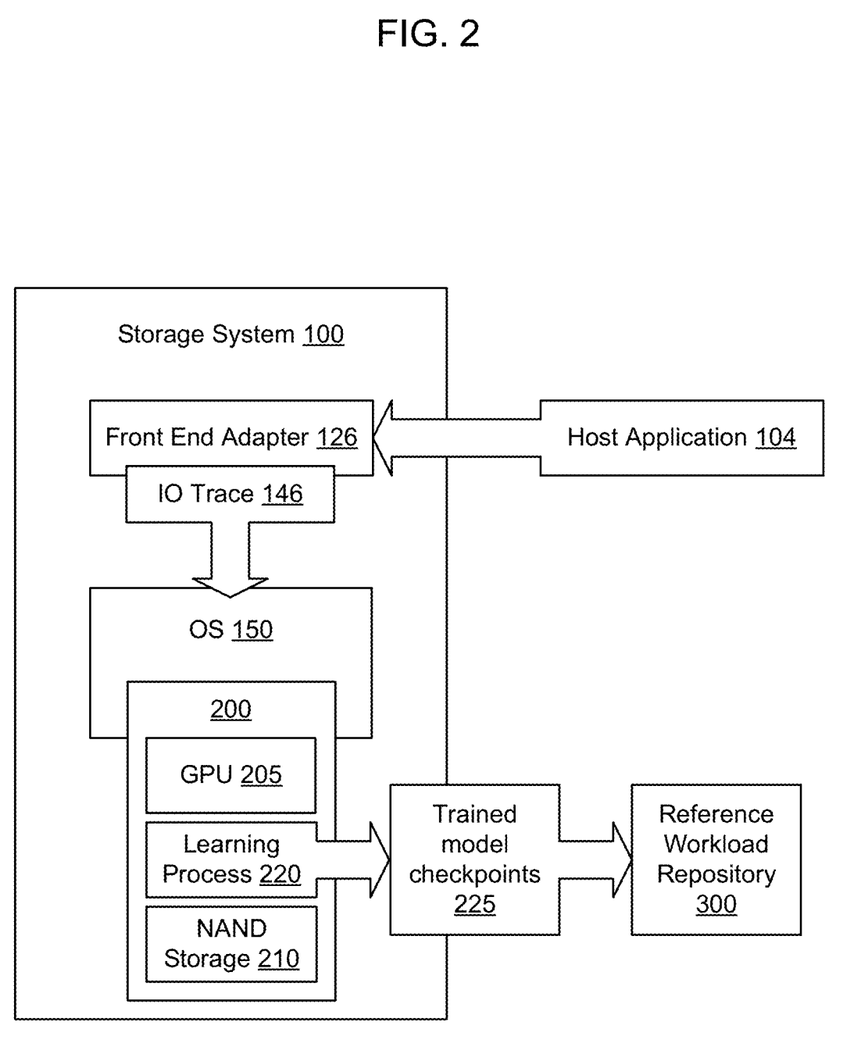
FIG. 2 is a functional block diagram of an example storage system configured with a workload monitoring system to detect application IO traffic and use the IO operations to train a learning process to learn the application workload characteristics, according to some embodiments.

FIG. 2 is a functional block diagram of an example storage system configured with a workload monitoring system 200 to detect application IO traffic and use the IO operations to train a learning process 220 to learn the application workload characteristics, according to some embodiments. The workload monitoring system 200 detects 10 traffic from an application 104 as the application issues IO operations 146 on the storage system 100, and uses the IO operations 146 as training examples to train the learning process 220 to learn the application address space and workload characteristics, according to some embodiments.

In some embodiments, the workload monitoring system 200 is implemented using a SLIC (Session Layer Interface Card) that is installed in a storage system 100 that is being used to by host application 104. The workload monitoring system (SLIC) 200 has a GPU (Graphics Processing Unit) 205 and storage 210. The workload monitoring system 200 monitors IO operations by host application 104 as they occur on operating system 150, and uses the IO operations as training examples to train the learning process 220.

By training the learning process 220 online at a customer site based on actual IO operations from an executing application, it is possible to train the learning process 220 without capturing and storing the 10 trace information or transferring the 10 trace information outside of the storage system 100. Further, the learning process 220 can train for a much longer time horizon than would be practical using a trace capture method. Once the learning process 220 is trained, trained model checkpoints 225 describing the trained learning process 220 are transferred to a reference workload repository 300. The reference workload repository 300 stores the trained model checkpoints 225 along with application metadata identifying the type of application and environment in which the application was executing when the learning process 220 was trained.

In some embodiments, the learning process 220 is implemented using a LSTM (Long Short-Term Memory) Neural Network, a RNN (Recurrent Neural Network) or other similar Artificial Intelligence (AI) learning process. The learning process 220 is trained using actual IO operations from an executing application as training examples. In some embodiments, as each IO operation is received, the IO operation is applied to the learning process to adjust the parameters of the learning process based on the characteristics of the IO operation. For example, the size of the IO operation, the address of the IO operation, and other parameters of the IO operation are used, in some embodiments, to adjust the values of nodes of the learning process. Once the learning process reaches a steady state, in which the values of the nodes of the learning process are sufficiently stable, the learning process may be considered to be trained such that the values of the nodes of the learning process describe the characteristics of the reference workload being generated by the application in that environment.

Once the learning process 220 has been trained, trained model checkpoints 225 describing the learning process 220 are transmitted to a reference workload repository 300. The trained model checkpoints 225 are then able to be used to create a test model 405 in a test server 400 (see FIG. 4), to enable the test server 400 to generate simulated test IO operations having the same IO characteristics as the reference workload. By creating the test model 405 in this manner, it is possible to configure the test server 400 to generate simulated test IO operations that mimic the workload characteristics of the actual application IO operations.

Figure 3:
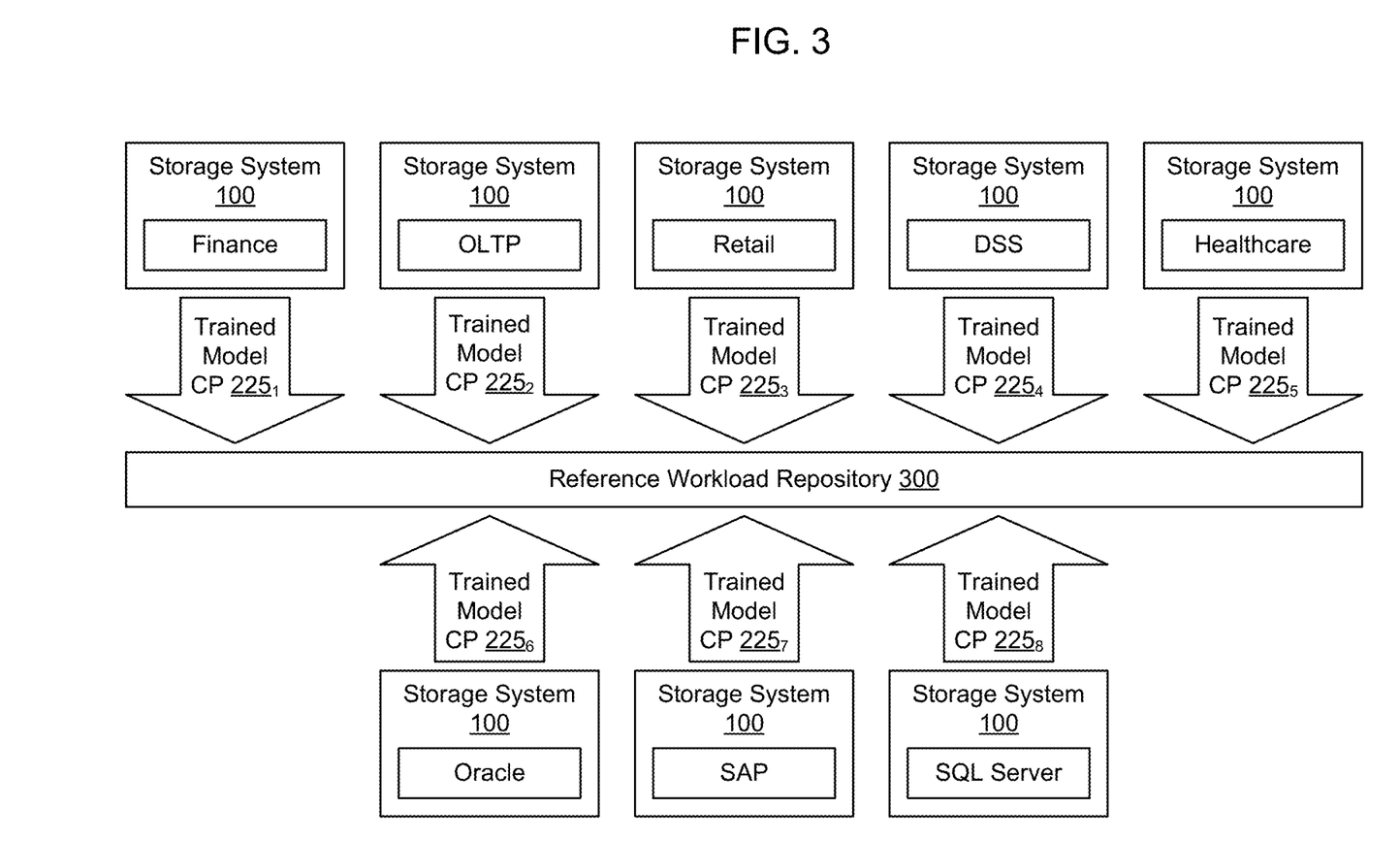
FIG. 3 is a functional block diagram of an example storage environment containing a reference workload repository configured to store training model checkpoints from multiple trained learning processes, according to some embodiments.

Different applications and different environments may generate workloads on a storage system having distinct IO workload characteristics. For example, an application that is used in a retail environment may generate workload on a storage system that has distinct IO characteristics than the same application would generate if it were to be used in a healthcare environment. Likewise, different applications may generate workloads on storage systems that have distinct IO characteristics. As shown in FIG. 3, in some embodiments a separate learning process is trained for each reference workload, based on environment/application combination. In FIG. 3, several example environments have been shown, including finance/banking, OnLine Transaction Processing (OLTP), Retail, Decision Support System (DSS), and Healthcare. It should be realized that there are many additional environments and the selection shown in FIG. 3 is not intended to be exhaustive. As shown in FIG. 3, reference workloads may also vary depending on the type of application. For example, Oracle, SAP, and SQL servers may all exhibit different types of workloads on storage systems 100.

In some embodiments, the traffic monitoring system shown in FIG. 2 is installed in storage systems being used in each of the respective application/environment combinations, to enable a separate learning process 220 to be trained to learn the IO characteristics of the reference workload of the application/environment combination. The trained model checkpoints 225 describing the trained learning processes 220 are then transmitted to the reference workload repository 300. The trained model checkpoints 225 are stored in the reference workload repository 300 along with metadata identifying the application and environment associated with the corresponding reference workload.

Figure 4:
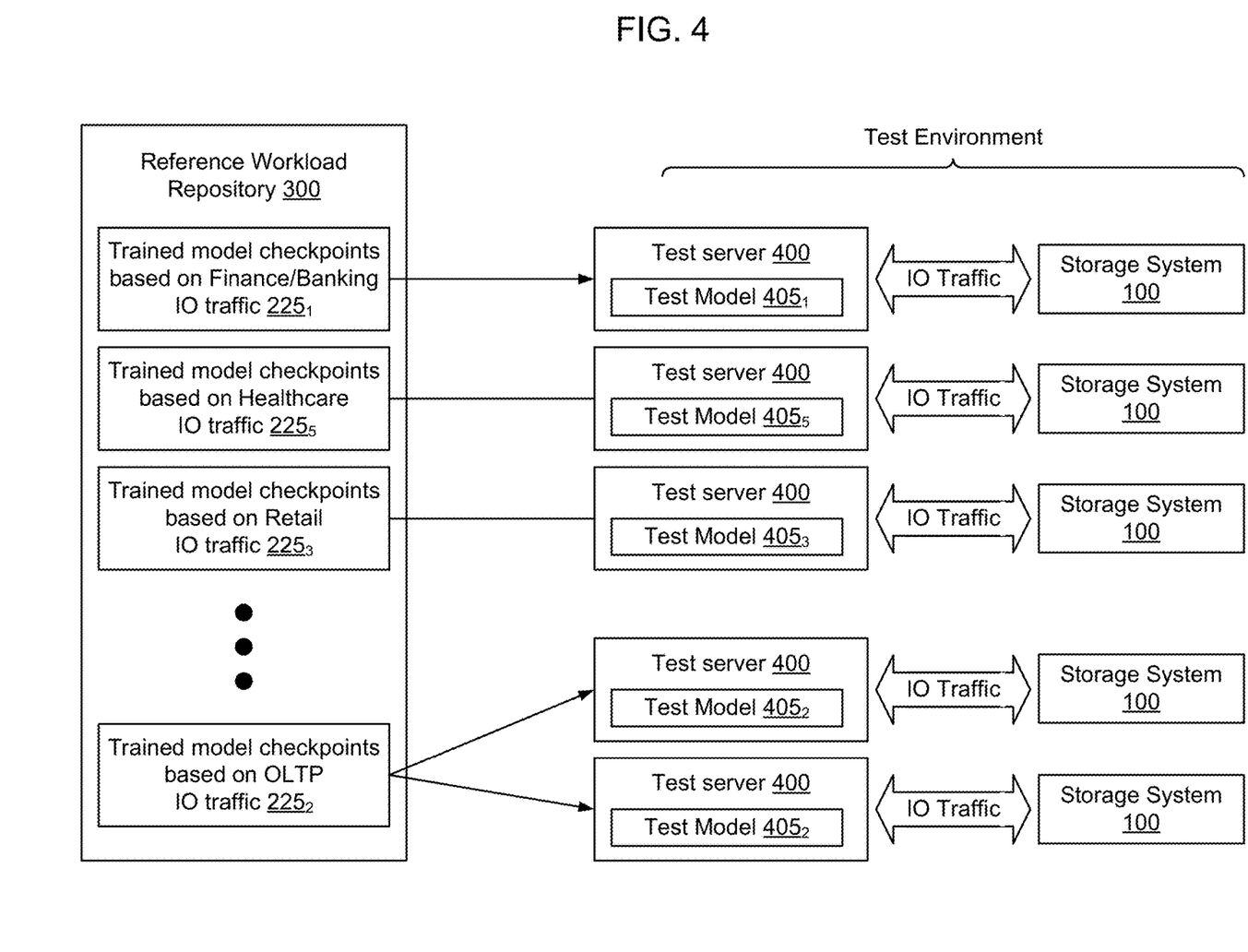
FIG. 4 is a functional block diagram of an example test environment containing a set of test servers configured to use the trained model checkpoints to create test models configured to generate simulated test IO operations for use in connection with testing storage systems, according to some embodiments.

FIG. 4 is a functional block diagram of an example test environment containing a set of test servers 400 configured to use the trained model checkpoints to create test models 405 configured to generate simulated test IO operations for use in connection with testing storage systems, according to some embodiments. As shown in FIG. 4, if a storage system 100 is to be tested, the proposed application and environment that will use the storage system are used to select one of the sets of trained model checkpoints 225 from the reference workload repository 300. The selected trained model checkpoints 225 are then used to configure a test model 405 on a test server 400. The configured test model 405 is configured, in some embodiments, to enable the test server 400 to generate simulated test IO operations having workload characteristics that are the same as or similar to the reference workload. The test IO operations are then applied by the test server 400 as input/output operations on the storage system under test, to determine the response of the storage system under test to the test IO workload. Since the test IO workload simulates the reference workload of a similar application in a similar environment, the test IO workload generated by the test server will have workload characteristics that are similar to workload characteristics that the storage system would be expected to encounter once deployed.

The test server 400 therefore does not need to actually run the application that the storage system will be interacting with once deployed, but rather simply creates a test model 405 to generate a simulated workload having the same workload characteristics as would be expected by the application when executing in the intended environment. Because the test server doesn't need to execute the application, the test server can be implemented using a low-cost computer. Further, because the test server 400 is not storing any actual IO trace data, the size of the memory of the test server does not constrain the amount of simulated test IO operations that the test server 400 can generate. Hence, the test server 400 can continue generating simulated test IO operations indefinitely. Since the test model 405 is based on the reference workload that most closely matches the workload that is to be applied to the storage system 100, the workload on the storage system associated with the simulated test IO operations will mimic the workload that the storage system should expect to encounter when the application is actually deployed in the environment.

For example, assume that a customer would like to deploy a SQL database in a finance/banking environment. To test how the storage system will execute in those conditions, trained model checkpoints 225 obtained from a learning process 220 that was trained in similar conditions will be selected. In this example, trained model checkpoints 225 from a trained learning process 220 will be selected from a learning process that was trained on a storage system where a SQL database was being used in a finance/banking environment. Since the learning process 220 was trained based on a reference workload in these conditions, the trained model checkpoints 225 obtained from that trained learning process 220 will describe the address space and other workload characteristics of this type of workload. The trained model checkpoints 225 are applied by the test server 400 to create and configure the test model 405. The test model 405 then is used by the test server 400 to generate simulated test IO operations on the storage system under test that have the same address space and other workload characteristics.

In some embodiments, training the learning process 220 causes the learning process 220 to learn the address space characteristics of the reference workload. Example address space characteristics might include the number of storage volumes used by the application, the distribution of addresses accessed by the application, the percentage of read and write operations, the size of the read and write operations, the sequentiality of the read and write operations, and other similar parameters that can be used to characterize the reference workload.

Figure 5:
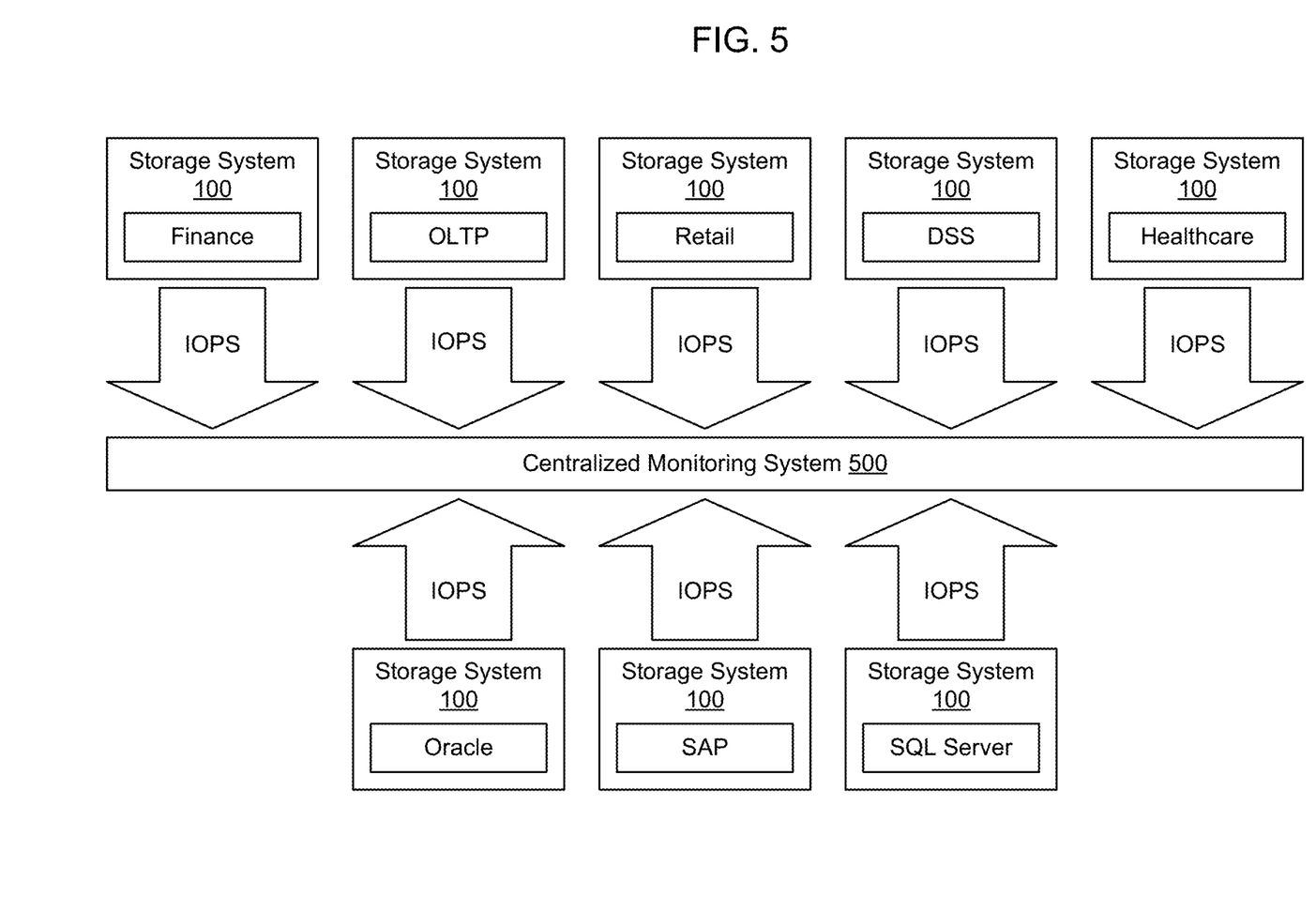
FIG. 5 is a functional block diagram of an example storage environment containing a centralized monitoring system configured to monitor workload volumes on storage systems as the storage systems process IO operations of applications, according to some embodiments.

FIG. 5 is a functional block diagram of an example storage environment containing a centralized monitoring system configured to monitor workload volumes on storage systems as the storage systems process IO operations of applications, according to some embodiments. In some embodiments, the trained learning processes 220 do not learn the frequency of the IO operations (number of IO operations per second) on the storage system, since this value might vary greatly between storage systems. Rather, as shown in FIG. 5, in some embodiments the frequency of the IO operations is determined using the centralized monitoring system that is configured to monitor multiple storage systems. The centralized monitoring system 500 keeps track of the IOPS (Input Output operations Per Second) of multiple deployed storage systems. In some embodiments, the test server 400 uses the IOPS information from the centralized monitoring system 500 of a storage system deployed in a similar operational state to cause the test server 400 to generate a comparable amount of simulated test IO operations in the test environment on the storage system under test.

Figure 6:
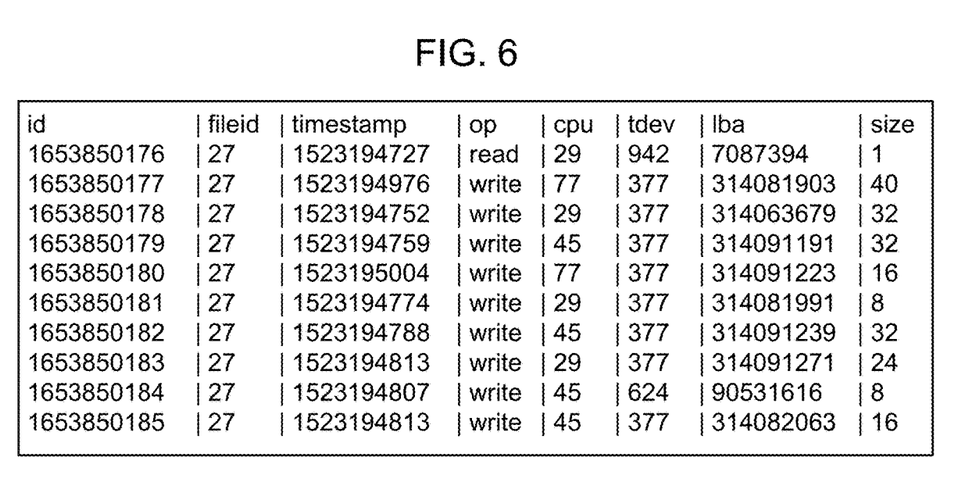
FIG. 6 is a data structure showing example IO traces obtained from an example executing application.

FIG. 6 is a data structure showing example IO traces obtained from an example executing application. Each IO trace, in FIG. 6, includes an IO trace ID, a file ID, a timestamp, the type of operation (read or write), the CPU that processed the IO trace, the Thin Device (TDev) on which the IO operation was issued, the address space (the logical block address (LBA) of the operation), and the size (number of blocks) of the IO operation. The example IO traces from the example executing application were input as training data to train a learning process to learn the address space characteristics of the reference workload. In this example, the learning process 220 was a LSTM learning process configured to learn the number of devices, the address space, the type of operation, and the size of the IO operations that characterize the reference workload.

Figure 7:
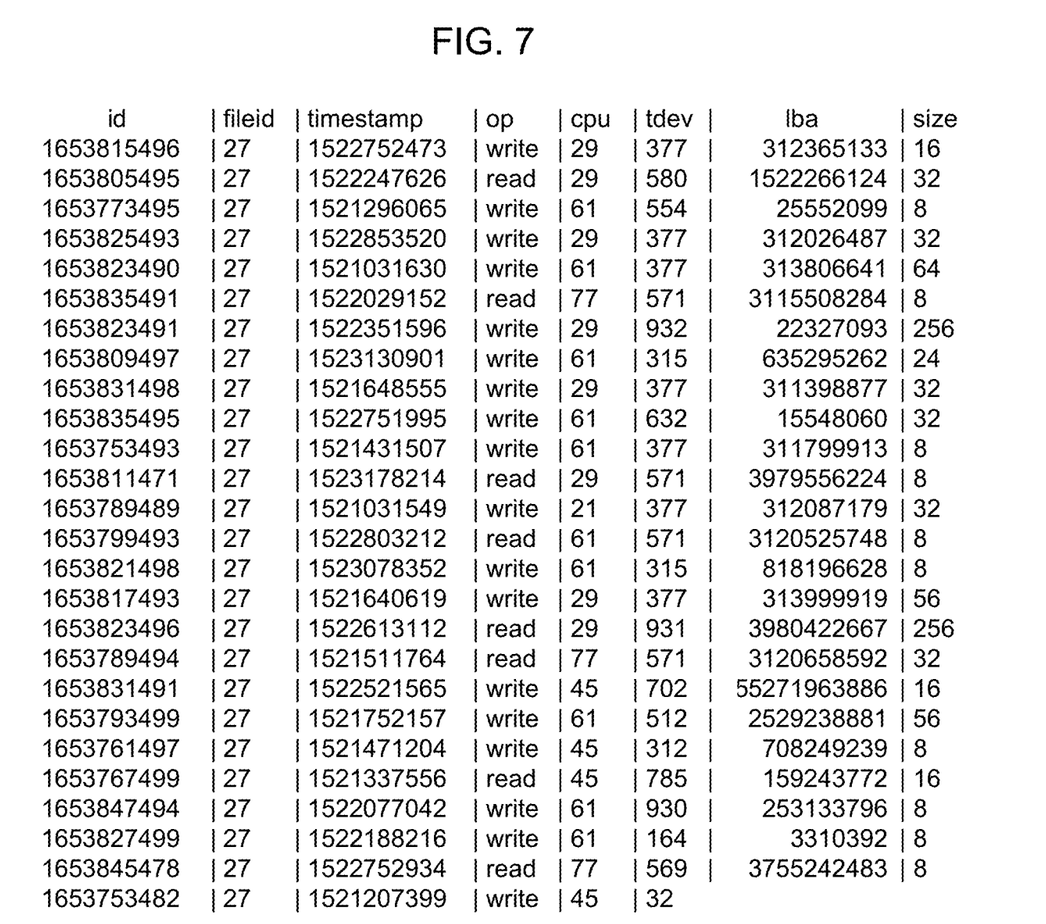
FIG. 7 is a data structure showing example simulated test IO traces generated by a test server, according to some embodiments.

FIG. 7 shows an example collection of simulated test IO operations generated by a test server 400 containing a test model 405 configured using the trained model checkpoints 225 from the learning process 220 that was trained using the example IO traces of FIG. 6.

Figure 8A:
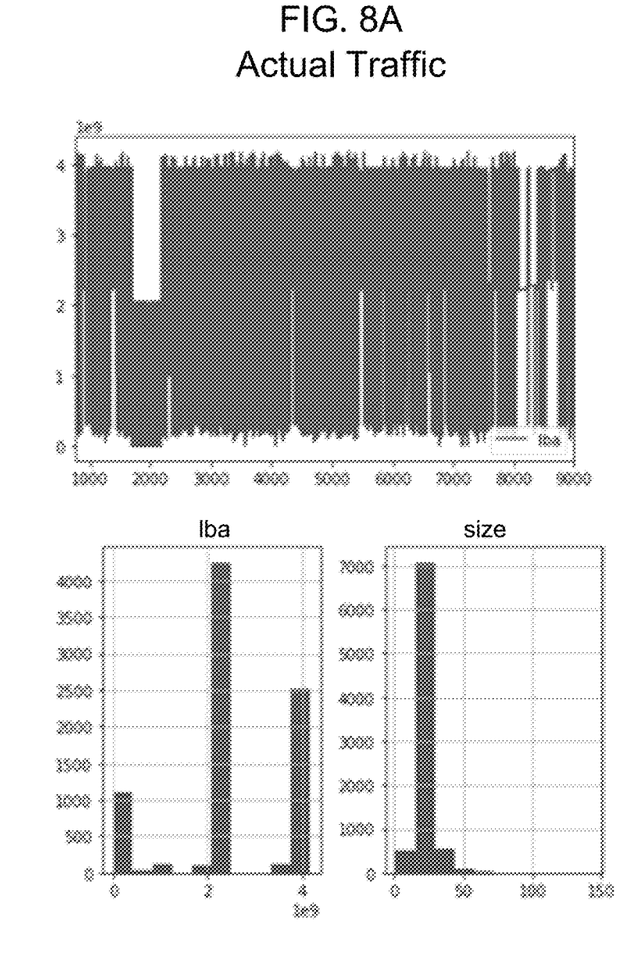
FIGS. 8A and 8B are graphs showing examples of an actual application workload on a storage system, and a simulated application workload generated by an example test server on a storage system, according to some embodiments.
Figure 8B:
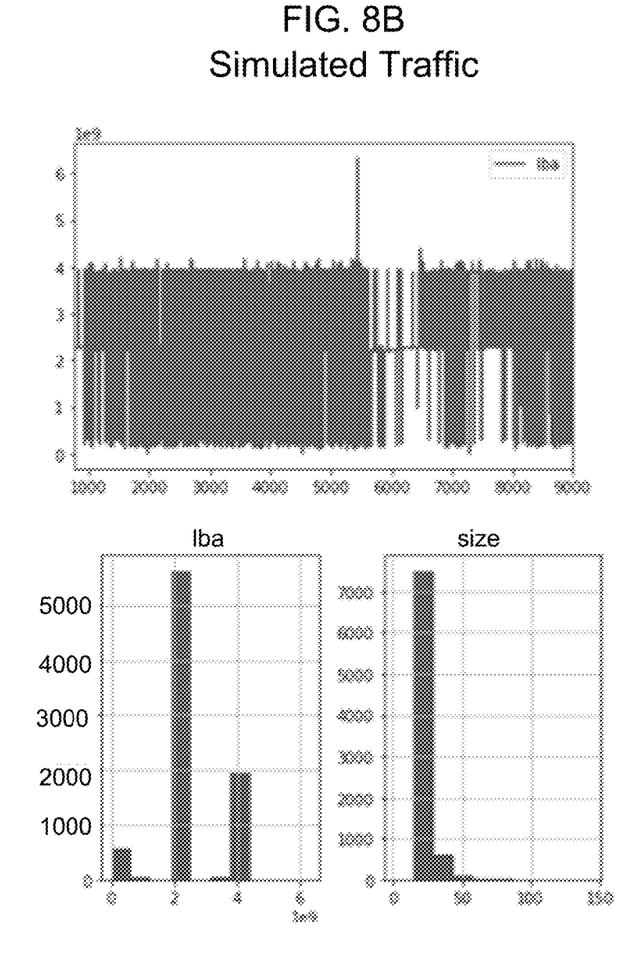

FIGS. 8A and 8B are graphs showing examples of an actual application workload on a first storage system (FIG. 8A), and a simulated application workload on a second storage system (FIG. 8B). The actual application workload was used to train a learning process 220, and trained model characteristics were then used to configure a test model 405 of a test server 400. The test server was then used to generate the simulated application workload shown in FIG. 8B.

As shown in FIGS. 8A and 8B, the test model 405 configured using the trained model checkpoints 225 from the trained learning process 220 was able to generate simulated test IO operations that exhibit characteristics similar to the characteristics of the reference workload. For example, a comparison of the workload characteristics of the workloads shown in FIGS. 8A and 8B shows that the two workloads (actual and simulated) have similar Logical Block Address (LBA) distributions and similar IO size distributions.

Since a configured test model 405 is able to recreate the address space characteristics of the reference workload, a test server 400 is able to generate simulated test IO operations that generally simulate a reference workload for a particular application executing in a particular environment. To determine the volume of IOs that should be generated by the test model 405, the centralized monitoring system 500 is used to determine the volume of IOPS to be generated, to enable the test server 400 to mimic production workloads of various applications in a test environment. This enables the workload of multiple environments and applications to be approximated in a laboratory environment using relatively inexpensive test servers 400, since the test servers 400 are simply generating IOs operations to be applied to the storage systems 100, and are not required to store a large number of test IO operations in memory or actually execute any of the applications.

Figure 9:
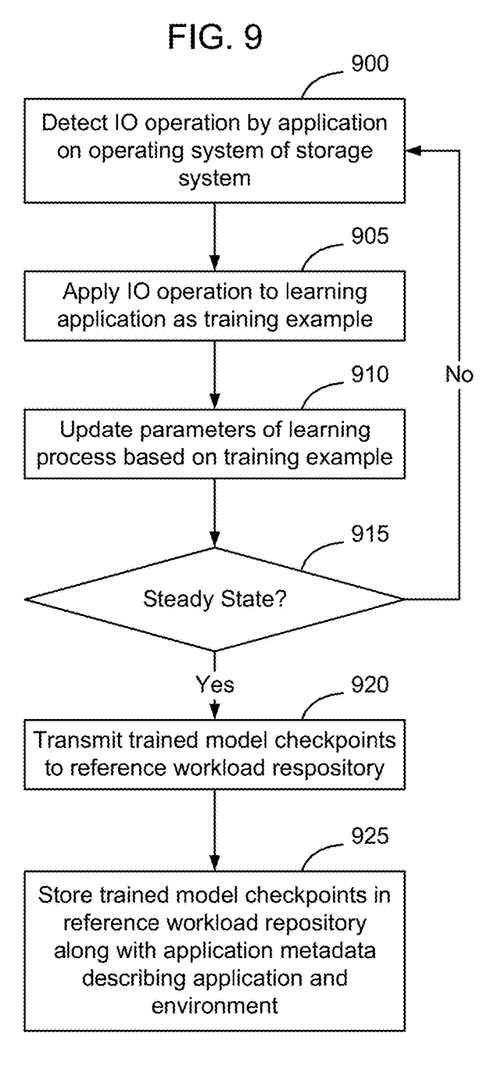
FIG. 9 is a flow chart of an example method of detecting IO operations of an executing application and using the IO operations as training examples to train a learning process to learn the application address space and other workload characteristics, according to some embodiments.

FIG. 9 is a flow chart of an example method of detecting IO operations of an executing application and using the IO operations as training examples to train a learning process to learn the application address space workload characteristics, according to some embodiments. As shown in FIG. 9, in some embodiments a learning process 220 is deployed in a storage system experiencing a reference workload from an application that is be used in a particular environment. When an IO operation by the application is detected on the operating system 150 of the storage system 100 (block 900), parameters of the IO operation are applied to the learning application 220 as a training example (block 905). The learning application 220 uses the training example to update parameters of the learning process, based on the characteristics of the IO operation (block 910). Example parameters characterizing the reference workload that the learning process might learn will vary depending on the implementation, and may include for example the number of devices used by the reference application, the size of operations, the address space (lba range), the ratio of read vs write operations, the sequentiality of the IO operations, and other similar parameters.

During the training process, parameters of the learning process will vary based on the characteristics of the IO operations. Over time, the parameters of the learning process will approach a steady state, in which the parameters are not changing significantly. At this stage, the learning process has been trained. Accordingly, in some embodiments the learning process is monitored to determine if it has reached a steady state. In particular, in some embodiments the parameters of the learning process are monitored to determine if the parameters have reached a steady state (block 915). If the learning process has not reached a steady state (a determination of NO at block 915), additional IO operations are applied to the learning process to continue the training process. If the learning process has reached a steady state (a determination of YES at block 915), trained model checkpoints 225 describing the trained learning process 220 are transmitted to a reference workload repository 300 (block 920). The trained model checkpoints describing the reference workload are stored in a reference workload repository 300 with application metadata describing the application that generated the reference workload and the environment in which the application was executing (block 925).

The process shown in FIG. 9 is implemented for multiple applications and multiple environments, to enable the reference workload repository 300 to contain trained model checkpoints 225 describing multiple types of reference workloads of applications executing in different environments.

Figure 10:
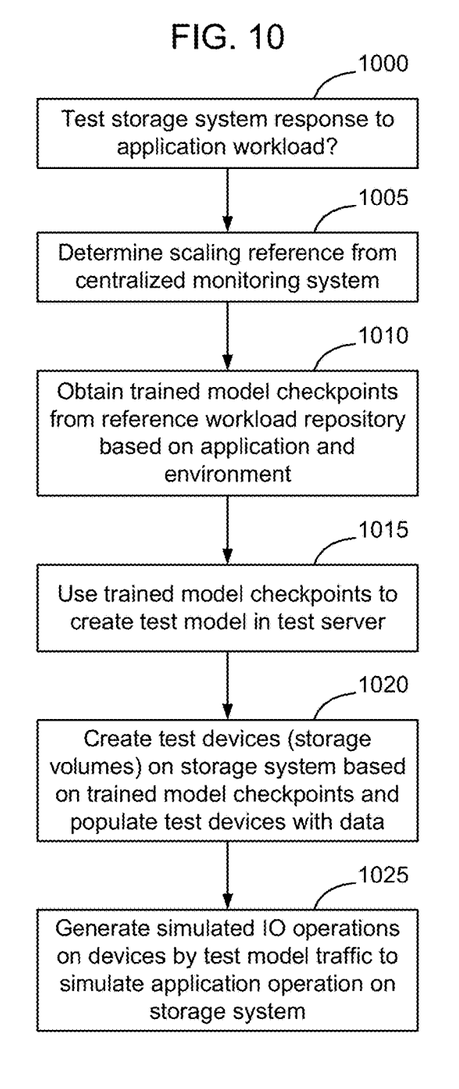
FIG. 10 is a flow chart of an example method of creating a test model based on trained model checkpoints, and using a test model to generate simulated test IO operations to be applied to test operation of a storage system, according to some embodiments.

FIG. 10 is a flow chart of an example method of creating a test model 405 based on trained model checkpoints 225 obtained from a trained learning process 220, and using the test model 405 to generate simulated test IO operations to be applied to test operation of a storage system under test, according to some embodiments.

As shown in FIG. 10, if an application is to be tested on a storage system (block 1000), the application type and the environment (retail, healthcare, banking, etc) is determined. This information (application type/environment) is then used to select a reference model containing a set of trained model checkpoints from the reference workload repository 300 (block 1010). Scaling information is also obtained from the centralized monitoring system (block 1005), which provides an indication of the number of IO operations per second that the test server should generate. Blocks 1010 and 1005 can be implemented in either order, or simultaneously, depending on the implementation.

The test server uses the trained model checkpoints to configure a test model in the test server (block 1015). A set of test devices (storage volumes) is also created on the storage system. In some embodiments, the set of test devices that are created is based on the trained model checkpoints. The devices are also populated with test data (block 1020). For example, if the trained model checkpoints indicate that the test model will generate IO operations on three devices, three devices would be created on the storage system under test. The devices are populated with data to enable the IO operations to be simulated on the storage system, because the storage system may respond differently if the devices are empty than if the devices contain data.

Once the devices are created on the storage system 100, the test server 400 generates simulated test IO operations on the test devices based on the scaling information and reference model to test how the storage system would be expected to perform if the storage system were to be used by the particular application in that environment (block 1025).

Although some embodiments have been described in which the test server 400 creates a single test model 405 and uses the test model to generate simulated test IO operations, it should be understood that a given test server 400 may create multiple test models 405 and apply generated simulated test IO operations from the multiple test models 405 on the same storage system 100. For example, a given test server may test response of the storage system to multiple applications in multiple environments. Likewise, a given test server may generate and issue simulated test IO operations on multiple storage systems 100.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of generating simulated Input/Output (IO) operations of an application, comprising:

training a learning process using IO operations of a reference workload generated by an executing instance of the application on a first storage system as training examples, to cause the learning process to learn workload characteristics of the reference workload of the executing instance of the application, the workload characteristics of the reference workload include a number of logical devices on which the IO operations were generated, a range of sizes of the IO operations of the reference workload, a sequentiality of the IO operations of the reference workload, a ratio of read vs write IO operations, and a range of addresses of the IO operations of the reference workload;

transmitting trained model checkpoints describing the learned workload characteristics of the reference workload from the first storage system to a reference workload repository;

storing the trained model checkpoints in the reference workload repository;

determining that a new instance of the application is to be deployed that, once deployed, will generate IO operations associated with a new workload on a second storage system;

retrieving the trained model checkpoints from the reference workload repository, by a test server;

using the trained model checkpoints to configure a test model in the test server;

determining an overall volume of simulated IO operations per second (IOPS) to be generated by the test model, the overall volume of IOPS to be generated being based on a determined overall volume of IO operations expected to be generated as the new workload by the new instance of the application once the new instance of the application is deployed;

using the test model, by the test server, to synthetically generate the overall volume of IOPS of simulated application IO operations, the generated simulated application IO operations having a number of logical devices, a range of size of IO operations, a sequentiality of IO operations, a ratio of read vs write IO operations, and a range of addresses, that are all based on the learned workload characteristics of the reference workload; and applying the overall volume of IO operations per second of simulated application IO operations, by the test server, to the second storage system to test a response of the second storage system to a simulated reference workload of the new instance of the application, prior to deploying the new instance of the application.

2. The method of claim 1, further comprising training multiple learning processes based on different reference workloads generated by different applications executing in different environments; and storing trained model checkpoints describing each respective trained learning process in the reference workload repository.

3. The method of claim 2, further comprising storing application metadata with respective trained model checkpoints in the reference workload repository, the application metadata identifying the application and environment that generated the reference workload that was used to train the respective learning process.

4. The method of claim 1, wherein the learning process is a Long Short-Term Memory Neural Network or a Recurrent Neural Network.

5. The method of claim 1, further comprising creating the number of logical devices used by the application on the second storage system, and populating the devices with data prior to generating the synthetically generated IO operations and prior to applying the synthetically generated IO operations to the second storage system.

6. A non-transitory tangible computer readable storage medium having stored thereon a computer program for generating simulated Input/Output (IO) operations of an application, the computer program including a set of instructions which, when executed by a computer, cause the computer to perform a method comprising the steps of:

training a learning process using IO operations of a reference workload generated by an executing instance of the application on a first storage system as training examples, to cause the learning process to learn workload characteristics of the reference workload of the executing instance of the application, the workload characteristics of the reference workload include a number of logical devices on which the IO operations were generated, a range of sizes of the IO operations of the reference workload, a sequentiality of the IO operations of the reference workload, a ratio of read vs write IO operations, and a range of addresses of the IO operations of the reference workload;

transmitting trained model checkpoints describing the learned workload characteristics of the reference workload from the first storage system to a reference workload repository;

storing the trained model checkpoints in the reference workload repository;

determining that a new instance of the application is to be deployed that, once deployed, will generate IO operations associated with a new workload on a second storage system;

retrieving the trained model checkpoints from the reference workload repository, by a test server;

using the trained model checkpoints to configure a test model in the test server;

determining an overall volume of simulated IO operations per second (IOPS) to be generated by the test model, the overall volume of IOPS to be generated being based on a determined overall volume of IO operations expected to be generated as the new workload by the new instance of the application once the new instance of the application is deployed;

using the test model, by the test server, to synthetically generate the overall volume of IOPS of simulated application IO operations, the generated simulated application IO operations having a number of logical devices, a range of size of IO operations, a sequentiality of IO operations, a ratio of read vs write IO operations, and a range of addresses, that are all based on the learned workload characteristics of the reference workload; and applying the overall volume of IO operations per second of simulated application IO operations, by the test server, to the second storage system to test a response of the second storage system to a simulated reference workload of the new instance of the application, prior to deploying the new instance of the application.

7. The non-transitory tangible computer readable storage medium of claim 6, further comprising training multiple learning processes based on different reference workloads generated by different applications executing in different environments; and storing trained model checkpoints describing each respective trained learning process in the reference workload repository.

8. The non-transitory tangible computer readable storage medium of claim 7, further comprising storing application metadata with respective trained model checkpoints in the reference workload repository, the application metadata identifying the application and environment that generated the reference workload that was used to train the respective learning process.

9. The non-transitory tangible computer readable storage medium of claim 6, wherein the learning process is a Long Short-Term Memory Neural Network or a Recurrent Neural Network.

10. The non-transitory tangible computer readable storage medium of claim 6, further comprising creating the number of logical devices used by the application on the second storage system, and populating the devices with data prior to generating the synthetically generated IO operations and prior to applying the synthetically generated IO operations to the second storage system.

11. A system for generating simulated Input/Output (IO) operations of an application, comprising:

one or more processors and one or more storage devices storing instructions that are operable, when executed by the one or more processors, to cause the one or more processors to perform operations comprising:

training a learning process using IO operations of a reference workload generated by an executing instance of the application on a first storage system as training examples, to cause the learning process to learn workload characteristics of the reference workload of the executing instance of the application, the workload characteristics of the reference workload include a number of logical devices on which the IO operations were generated, a range of sizes of the IO operations of the reference workload, a sequentiality of the IO operations of the reference workload, a ratio of read vs write IO operations, and a range of addresses of the IO operations of the reference workload;

transmitting trained model checkpoints describing the learned workload characteristics of the reference workload from the first storage system to a reference workload repository;

storing the trained model checkpoints in the reference workload repository;

determining that a new instance of the application is to be deployed that, once deployed, will generate IO operations associated with a new workload on a second storage system;

retrieving the trained model checkpoints from the reference workload repository, by a test server;

using the trained model checkpoints to configure a test model in the test server;

determining an overall volume of simulated IO operations per second (IOPS) to be generated by the test model, the overall volume of IOPS to be generated being based on a determined overall volume of IO operations expected to be generated as the new workload by the new instance of the application once the new instance of the application is deployed;

using the test model, by the test server, to synthetically generate the overall volume of IOPS of simulated application IO operations, the generated simulated application IO operations having a number of logical devices, a range of size of IO operations, a sequentiality of IO operations, a ratio of read vs write IO operations, and a range of addresses, that are all based on the learned workload characteristics of the reference workload; and applying the overall volume of IO operations per second of simulated application IO operations, by the test server, to the second storage system to test a response of the second storage system to a simulated reference workload of the new instance of the application, prior to deploying the new instance of the application.

12. The system of claim 11, further comprising training multiple learning processes based on different reference workloads generated by different applications executing in different environments; and storing trained model checkpoints describing each respective trained learning process in the reference workload repository.

13. The system of claim 12, further comprising storing application metadata with respective trained model checkpoints in the reference workload repository, the application metadata identifying the application and environment that generated the reference workload that was used to train the respective learning process.

14. The system of claim 11, wherein the learning process is a Long Short-Term Memory Neural Network or a Recurrent Neural Network.

15. The system of claim 11, further comprising creating the number of logical devices used by the application on the second storage system, and populating the devices with data prior to generating the synthetically generated IO operations and prior to applying the synthetically generated IO operations to the second storage system.

* * * * *